US011284448B2

(12) United States Patent
Xu et al.

(10) Patent No.: US 11,284,448 B2
(45) Date of Patent: *Mar. 22, 2022

(54) BANDWIDTH PART ACTIVATION

(71) Applicant: Apple Inc., Cupertino, CA (US)

(72) Inventors: Fangli Xu, Beijing (CN); Dawei Zhang, Saratoga, CA (US); Haijing Hu, Beijing (CN); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,113

(22) Filed: Dec. 3, 2020

(65) Prior Publication Data
US 2021/0176792 A1 Jun. 10, 2021

Related U.S. Application Data

(63) Continuation of application No. 15/770,745, filed as application No. PCT/CN2017/111497 on Nov. 17, 2017, now Pat. No. 10,887,917.

(51) Int. Cl.
*H04W 72/12* (2009.01)
*H04W 74/08* (2009.01)

(52) U.S. Cl.
CPC ... *H04W 74/0833* (2013.01); *H04W 72/1289* (2013.01)

(58) Field of Classification Search
CPC .............................. H04W 72/04; H04W 74/08
See application file for complete search history.

(56) References Cited

U.S. PATENT DOCUMENTS

| 9,780,929 | B2 | 10/2017 | Yi |
| 2018/0124687 | A1 | 5/2018 | Park |
| 2018/0139778 | A1 | 5/2018 | Chou |
| 2021/0076445 | A1* | 3/2021 | Tsai ............... H04W 76/19 |

FOREIGN PATENT DOCUMENTS

| CN | 107295649 A | 10/2017 |
| WO | 2018084571 A1 | 5/2018 |

OTHER PUBLICATIONS

Nokia, Nokia Shanghai Bell; "Cell and BWP relation"; 3GPP TSG-RAN WG2 #99bis; R2-1711065; Oct. 8, 2017; five pages.
International Search Report and Written Opinion, Application No. PCT/CN2017/111497, dated Aug. 7, 2018, 9 pages.

* cited by examiner

*Primary Examiner* — Michael T Vu
(74) *Attorney, Agent, or Firm* — Kowert, Hood, Munyon, Rankin & Goetzel, P.C.

(57) ABSTRACT

This disclosure relates to performing bandwidth part activation in a cellular communication system. A wireless device may attach to a network via a cell that includes multiple bandwidth parts. The wireless device may receive an indication activating a non-default bandwidth part for the wireless device. A bandwidth part activation timer may be initiated based at least in part on activation of the non-default bandwidth part. At expiration of the bandwidth part activation timer, the wireless device may deactivate the non-default bandwidth part and activate a default bandwidth part if there is not a procedure to perform an uplink data transfer in progress. If there is a procedure to perform an uplink data transfer in progress at expiration of the bandwidth part activation timer, the procedure may be completed via the non-default BWP even after expiration of the bandwidth part activation timer.

20 Claims, 8 Drawing Sheets

BANDWIDTH PART ACTIVATION

PRIORITY INFORMATION

This application is a continuation of U.S. patent application Ser. No. 15/770,745, filed Apr. 24, 2018, and titled "Bandwidth Part Activation", claims benefit of priority to Chinese Application No. PCT/CN2017/111497, titled "Bandwidth Part Activation", filed Nov. 17, 2017, which is incorporated herein by reference in its entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless communications, and more particularly to systems, apparatuses, and methods for performing bandwidth part activation in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for performing bandwidth part activation in a cellular communication system.

Some cells may be configured such that multiple bandwidth parts of the cell are defined, and such that it may be possible to configure a wireless device served by the cell to utilize one of those bandwidth parts at a given time. Included among possible techniques for switching between such bandwidth parts may be explicit and implicit activation techniques. Explicit activation may include explicitly signaling to a wireless device to activate a (e.g., non-default) bandwidth part, at least in some embodiments. Implicit activation may include utilizing a timer to facilitate determination of a time at which activation of a non-default bandwidth part expires, e.g., at which time the non-default bandwidth part may be deactivated and a wireless device may reactivate a default bandwidth part configured for the wireless device.

When implicit bandwidth part activation is used, if there is any activity/procedure in progress on a non-default bandwidth part at the time specified to fallback to the default bandwidth part according to the timer, deactivating the non-default bandwidth part may interrupt the activity. This may in turn cause the wireless device to restart the procedure, thus potentially increasing the uplink data transmission latency compared to if the procedure were allowed to complete using the bandwidth part on which the procedure began. Restarting such a procedure may also increase the signaling load on the network. Accordingly, it may be beneficial to allow such an activity to be completed on a non-default bandwidth part even after expiration of the timer controlling the wireless device's implicit bandwidth part activation, if such an activity is in progress when the timer expires.

Accordingly, techniques are presented herein for implicit bandwidth part activation and deactivation such that fallback can be temporarily delayed (and possibly avoided) in certain exceptional cases, such as when a procedure to attempt to perform an uplink data transfer is in progress at the time of expiration of a bandwidth part activation timer. Such techniques may help avoid potentially excessive signaling load and/or potentially unnecessary increases in uplink data transmission latency, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
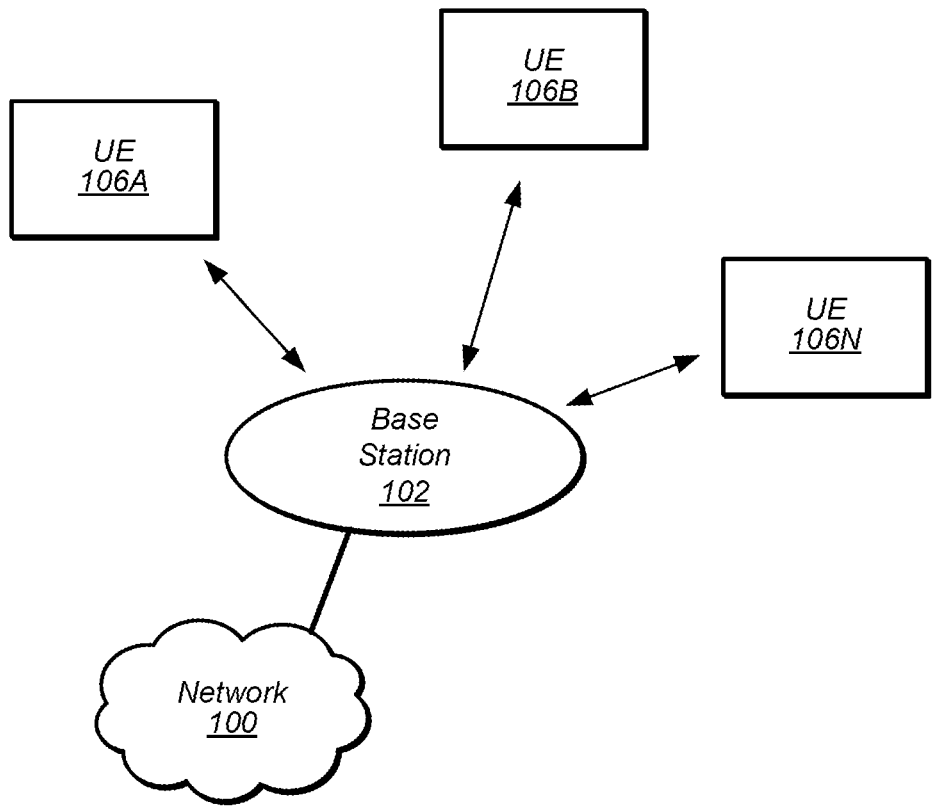
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™_based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
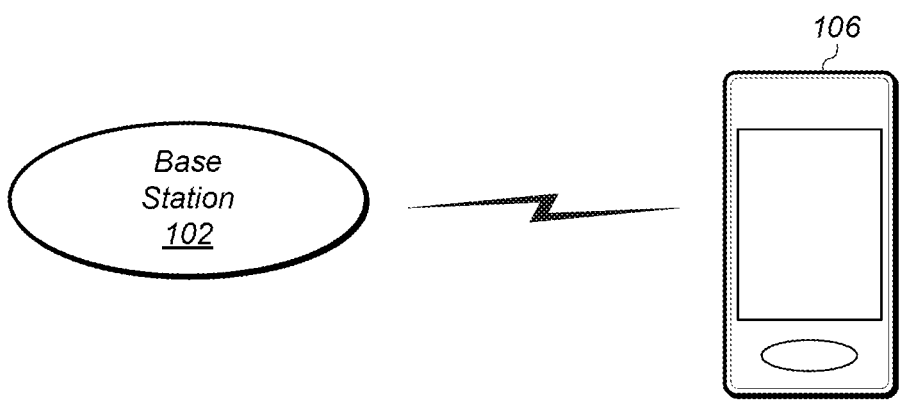
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform cellular communication using modular control channel formats for uplink control information, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments.

The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH™. Other configurations are also possible.

Figure 3:
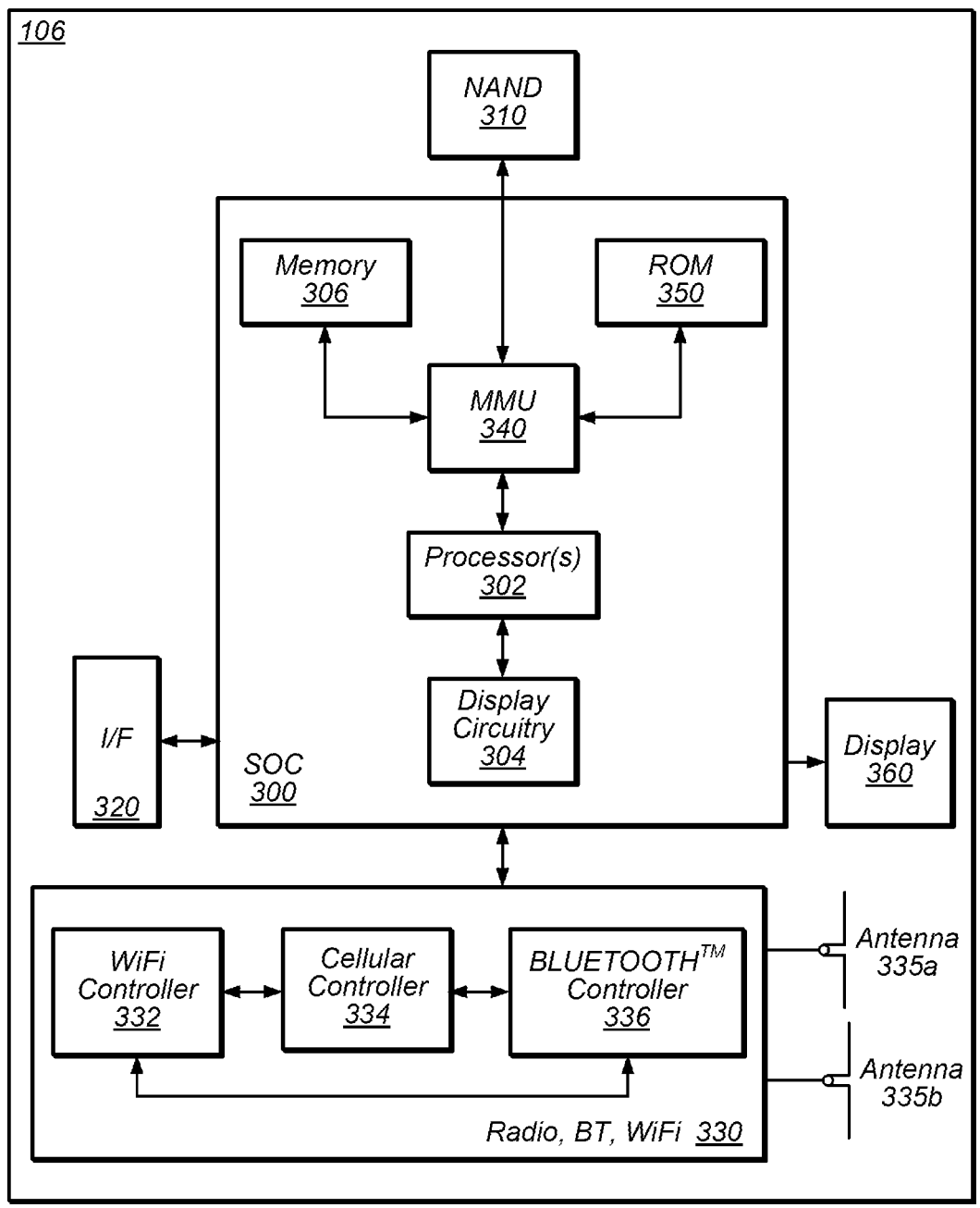
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform bandwidth part activation in a cellular communication system. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform bandwidth part activation in a cellular communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g. NR controller) 334, and BLUETOOTH™ controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH™ controller 336 may communicate with cellular controller 334 over a cell-ISM link, etc. While three separate controllers are illustrated within radio 330, other embodiments have fewer or more similar controllers for various different RATs that may be implemented in UE device 106.

Figure 4:
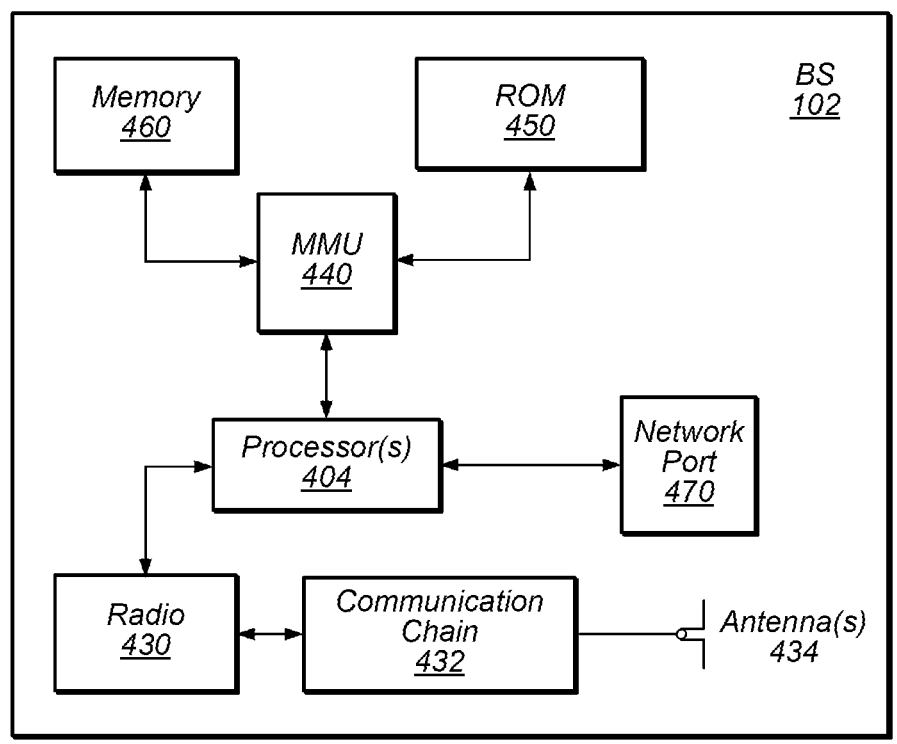
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform bandwidth part activation in a cellular communication system.

Figure 5:
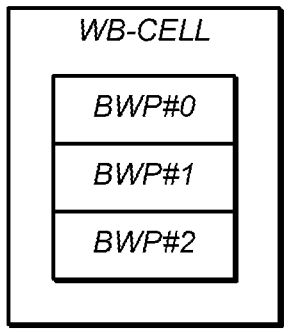
FIG. 5 illustrates aspects of an exemplary possible wideband cell having multiple possible bandwidth parts, according to some embodiments.
Figure 6:
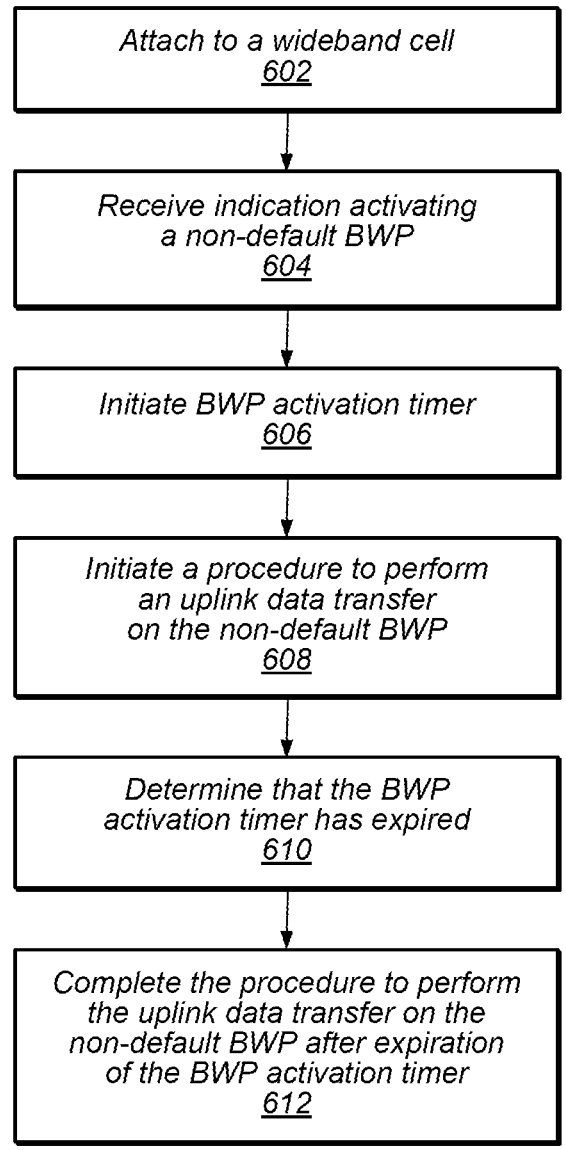
FIG. 6 is a flowchart diagram illustrating an exemplary possible method for performing bandwidth part activation in a cellular communication system, according to some embodiments.

FIGS. 5-6—Bandwidth Part Activation

At least in some cellular communication systems, wideband cells may be provided by a cellular network. A wideband cell may include multiple bandwidth parts, e.g., such that it may be possible for a wireless device to be configured to utilize just a portion of the total cell bandwidth at a given time. FIG. 5 illustrates a possible representation of such a wideband cell including multiple possible bandwidth parts, according to some embodiments. In the illustrated example, the wideband (WB) cell may include three bandwidth parts (BWPs), i.e., BWP #0, BWP #1, and BWP #2. In other scenarios, different configurations (e.g., including a different number of BWPs, and/or any of various other possible differences) may also be possible for a WB cell.

In some systems (e.g., at least some 5G NR deployments), it may be the case that a wireless device can only work on one BWP at a time, though multiple BWPs may be configured for a given wireless device. For example, a wireless device may be configured to monitor a downlink control channel and perform data transmission/reception on an activated BWP, but may be configured to not monitor the downlink control channel or perform data transmission/reception.

Any of a variety of techniques may be used for switching between active/activated BWPs. Two possible examples may include explicit and implicit activation techniques. When explicitly activating a BWP, signaling may explicitly be provided to a wireless device indicating that a certain BWP is being activated for the wireless device, for example using downlink control information. Implicitly activating a BWP may be based at least in part on a BWP activation timer. In such a case, a wireless device may be configured to have a default BWP, and may start the BWP activation timer when switching to a non-default BWP. Upon timer expiry, the wireless device may fallback to the default BWP, thus implicitly activating the default BWP. At least in some instances, it may be the case that the BWP activation timer can be restarted when a successfully decoded downlink control information communication scheduling downlink data is received by the wireless device, and/or under one or more other conditions.

Allowing a wireless device to work on a bandwidth smaller than the entire cell bandwidth using such techniques may be beneficial, at least in some instances, for example with respect to wireless device power consumption, improving support for wireless devices that have lower bandwidth capabilities, and/or for providing interference mitigation qualities, among various possibilities. However, it may be important to carefully design the activation/deactivation schemes, particularly including implicit BWP activation/deactivation techniques, to avoid possible increased signaling load and/or uplink data transmission latency that could potentially occur if a wireless device has uplink data to transmit around the time of expiration of the BWP activation timer.

Accordingly, FIG. 6 is a flowchart diagram illustrating a method for a wireless device (e.g., a wireless user equipment (UE) device) to perform bandwidth part activation in a cellular communication system, which may avoid excessive signaling load and/or uplink data transmission latency when a wireless device has initiated but not yet completed an uplink data communication when a BWP activation timer expires, at least according to some embodiments.

Aspects of the method of FIG. 6 may be implemented by a wireless device, e.g., in conjunction with a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 6 are described in a manner relating to the use of communication techniques and/or features associated with NR and/or 3GPP specification documents, such description is not intended to be limiting to the disclosure, and aspects of the method of FIG. 6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

In 602, the wireless device may attach to a wideband cell provided by a cellular network. The wideband cell may be configured to include multiple BWPs, e.g., such that it may be possible to serve various wireless devices using different subsets of the total cell bandwidth. As part of the process of attaching to the cell or during another configuration operation (e.g., while establishing or reconfiguring a radio resource control connection between the wireless device and the cell), the wireless device may receive configuration information indicating a default BWP for the wireless device, and/or may receive configuration information indicating a BWP activation timer length, among various other possible configuration information. The default BWP may be a BWP of the cell to which the wireless device may activate by default, e.g., if no other (e.g., non-default) BWP is explicitly activated or if activation of a non-default BWP expires. The BWP activation timer length may be the specified length of a timer that is initiated upon activation (and which may potentially be reset to extend activation under certain conditions) of a non-default BWP, e.g., to provide a way to implicitly deactivate the non-default BWP and/or reactivate the default BWP.

In 604, the wireless device may receive an indication activating a non-default BWP. The indication may be provided via downlink control information (e.g., that may also schedule a data communication), e.g., on a downlink control channel such as a 5G NR physical downlink control channel (PDCCH), according to some embodiments. Once activated, the non-default BWP may be used for downlink control channel monitoring by the wireless device, and for uplink and/or downlink data transmissions.

In 606, the wireless device may initiate a BWP activation timer for the non-default BWP. As previously noted, the BWP activation timer may provide an implicit mechanism for eventually deactivating the non-default BWP and reactivating the default BWP for the wireless device. The timer may be started based on activation of the non-default BWP, e.g., upon switching to the non-default BWP. At least according to some embodiments, the timer may be restarted (or otherwise modified to extend the amount of time until its expiration) when the wireless device successfully decodes downlink control information to schedule a data transmission on the non-default BWP, e.g., as a way of implicitly extending the activation of the non-default BWP.

If there are no activities (such as a procedure to attempt to initiate/perform an uplink data transfer, and/or possibly a network triggered random access channel procedure) currently in progress that are configured to at least temporarily extend use of the non-default BWP when the BWP activation timer expires, the wireless device may deactivate the non-default BWP and activate the default BWP at that time. However, if there is any such activity/procedure in progress, deactivating the non-default BWP may interrupt them, which may in turn force the wireless device to begin the procedure again, which may increase the uplink data transmission latency as well as increase the signaling load on the network, at least in some instances. Accordingly, it may be beneficial to allow such an activity to be completed on a non-default BWP even after expiration of the BWP activation timer for the non-default BWP, if such an activity is in progress when the BWP activation timer expires.

Thus, in 608, the wireless device may initiate a procedure to perform an uplink data transfer on the non-default BWP. According to some embodiments, the procedure may include a scheduling request, e.g., if the wireless device has timing synchronization with the network. Alternatively (or additionally), the procedure may include a random access channel procedure, e.g, if the wireless device does not currently have timing synchronization with the network, and/or if the wireless device previously unsuccessfully attempted a scheduling request procedure. Initiation of the procedure to perform an uplink data transfer on the non-default BWP may be triggered by generation of uplink data for transmission by the wireless device and arrival of that uplink data in a baseband buffer of the wireless device, at least according to some embodiments. As an alternative or additional possibility, in some embodiments the wireless device may perform a network triggered random access channel procedure, e.g., to attempt to perform a downlink data transfer on the non-default BWP.

In 610, the wireless device may determine that the BWP activation timer for the non-default BWP has expired. As previously noted, if there is no procedure considered to be an exception in progress upon expiration of the BWP activation timer, the wireless device may deactivate the non-default BWP and activate the default BWP when the BWP activation timer expires. However, if the procedure to perform the uplink data transfer on the non-default BWP (or another procedure defined as such an exception) is still in progress at expiration of the BWP activation timer, the wireless device may not deactivate the non-default BWP or activate the default BWP immediately upon expiration of the BWP activation timer.

In such an instance, in 612, the wireless device may complete the procedure to perform the uplink data transfer on the non-default BWP after expiration of the BWP activation timer for the non-default BWP. In other words, activation of the non-default BWP may extend after expiration of the BWP activation timer under certain defined exceptional circumstances, such as if a procedure to perform an uplink data transfer is in progress at that time.

Completion of the procedure to perform the uplink data transfer may be successful or unsuccessful. For example, as one possibility, the wireless device may consider the procedure to perform the uplink data transfer to be completed unsuccessfully if the wireless device does not receive a response (or is unable to decode a response) from the network in response to a scheduling request (e.g., in the case of a scheduling request procedure), or a message 1 or message 3 (e.g., in the case of a random access channel procedure) within a certain amount of time after a certain number of retries. The specified number of retries and/or the amount of time without receiving a response may be configured by the network, or may be determined internally by the wireless device, or may be specified by wireless communication standard specification documents, among various possibilities.

At least in some instances, if the procedure to perform the uplink data transfer is completed unsuccessfully, the wireless device may then fallback to the default BWP (e.g., may deactivate the non-default BWP and activate the default BWP). Alternatively, at least in some instances, if the procedure to perform the uplink data transfer is completed unsuccessfully, the wireless device may follow up with another procedure to attempt to perform the uplink data transfer on the non-default BWP, e.g., still after expiration of the BWP activation timer. For example, if desired, after an unsuccessful scheduling request procedure on the non-default BWP that completes after expiration of the BWP activation timer, the wireless device may also attempt a random access channel procedure on the non-default BWP. Alternatively, such a follow-up procedure may be performed on the default BWP after fallback, if desired.

At least according to some embodiments, the wireless device may consider the procedure to perform the uplink data transfer to be completed successfully if the wireless device receives an uplink grant from the network as part of the procedure (e.g., if the wireless device receives an uplink grant from the network in response to a scheduling request provided from the wireless device to the network in the case of a scheduling request procedure, or if the wireless device receives a message 2 from the network in response to a message 1 provided from the wireless device and a message 4 from the network in response to a message 3 provided from the wireless device in the case of a random access channel procedure). In such a case, the wireless device may perform the uplink data transfer (e.g., via the non-default BWP) using the provided uplink grant. Note that in some instances, e.g., in the case of a network triggered RACH procedure, successful completion of the procedure may occur when the wireless device receives a downlink assignment for a new data transmission.

Note additionally that, at least in some embodiments, if downlink control information (e.g., scheduling the requested uplink data transfer in response to the procedure to perform the uplink data transfer, or possibly scheduling another data transfer) is received by the wireless device via the non-default BWP, the wireless device may restart (or otherwise extend) the BWP activation timer for the non-default BWP, potentially even after expiration of the BWP activation timer.

Thus, the techniques for BWP activation and deactivation described according to the method of FIG. 6 may allow for implicit fallback from a non-default BWP to a default BWP upon expiration of a BWP activation timer, but may temporarily delay (and possibly avoid) such fallback in certain exceptional cases, such as when a procedure to attempt to perform an uplink data transfer is in progress at the time of expiration of the BWP activation timer. Such techniques may help avoid potentially excessive signaling load and/or potentially unnecessary increases in uplink data transmission latency, at least according to some embodiments.

FIGS. 7-10—BWP Activation Scheme Timelines

FIGS. 7-10 illustrate various possible implicit bandwidth part activation timelines that could occur when a UE has uplink data according to various bandwidth part activation schemes, according to some embodiments. Note that FIGS. 7-10 and the following information are provided as being illustrative of further considerations and possible implementation details relating to the method of FIG. 6, and are not intended to be limiting to the disclosure as a whole. Numerous variations and alternatives to the details provided herein below are possible and should be considered within the scope of the disclosure.

Figure 7:
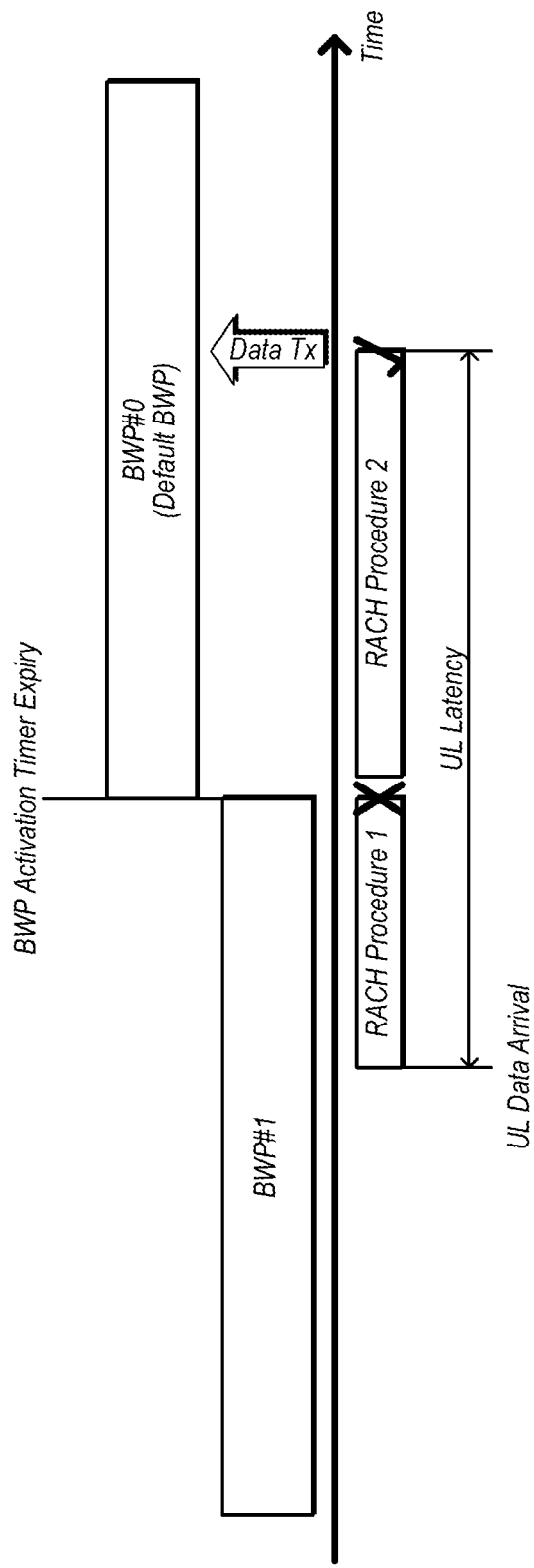
FIGS. 7-10 illustrate various possible implicit bandwidth part activation timelines that could occur when a UE has uplink data according to various bandwidth part activation schemes, according to some embodiments.

FIG. 7 illustrates a possible timeline in which a wireless device deactivates a non-default BWP and activates a default BWP upon expiration of a BWP activation timer regardless of whether this interrupts any ongoing procedures. This can occur during an uplink related procedure such as a scheduling request procedure or a random access channel procedure, that the network may not know in advance that the wireless device has begun. For example, since the BWP activation timer (which may alternatively be referred to as a BWP deactivation timer) is controlled and updated by the network, e.g., via explicit signaling, and such procedures may require a time window or retransmission scheme to complete the procedure, it may be possible that there is not downlink control information provided to trigger restarting of the BWP activation timer before expiration of the BWP activation timer while an uplink related procedure is occurring.

In such a scenario, as shown, expiration of the BWP Activation timer may interrupt a uplink related procedure in progress (e.g., a RACH procedure, as shown), and the wireless device may deactivate the non-default BWP (e.g., BWP #1) and activate the default BWP (e.g., BWP #0). At this point, the wireless device may restart the RACH procedure, and eventually perform the desired uplink activity via the default BWP, with substantial additional uplink latency and signaling load introduced by the interruption to the procedure.

Figure 8:
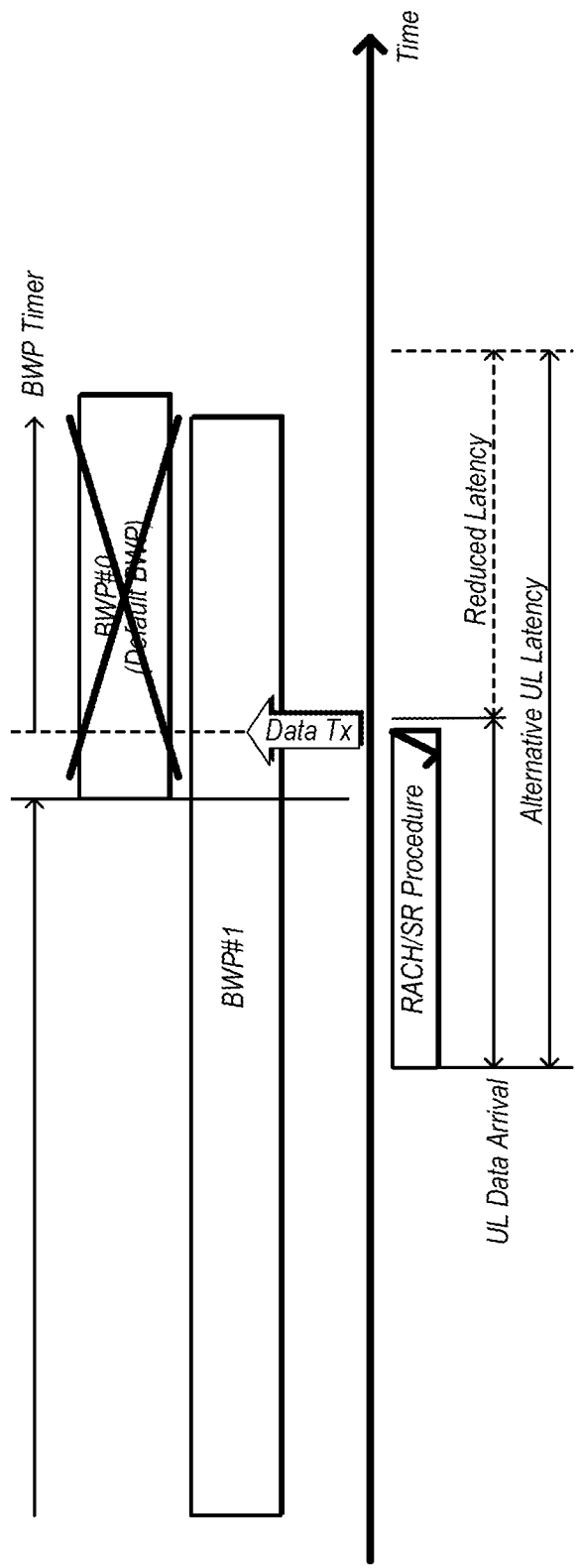

FIG. 8 illustrates an alternative approach in which a wireless device deactivates a non-default BWP and activates a default BWP upon expiration of a BWP activation timer, unless this interrupts an ongoing procedure considered to be an exception, such as a scheduling request or random access channel procedure to attempt to initiate an uplink data transmission. As shown, in such a scenario, at expiration of the BWP activation timer, an ongoing RACH/SR procedure may continue on the non-default BWP, e.g., even after the BWP timer has expired (e.g., until completion). In other words, a BWP may remain activated while a SR or RACH procedure is ongoing, regardless of whether the BWP activation timer expires or not. Further, during the procedure, it may be possible for the BWP activation timer to be restarted, e.g., in accordance with a policy such that the timer is restarted upon successfully decoding DCI that schedules the PDSCH/PUSCH. In this case, the wireless device may continue using the non-default BWP, even after a gap between the timer expiring and being restarted. This may reduce the uplink latency and/or signaling load experienced by the wireless device, e.g., compared to the approach of FIG. 7.

Figure 9:
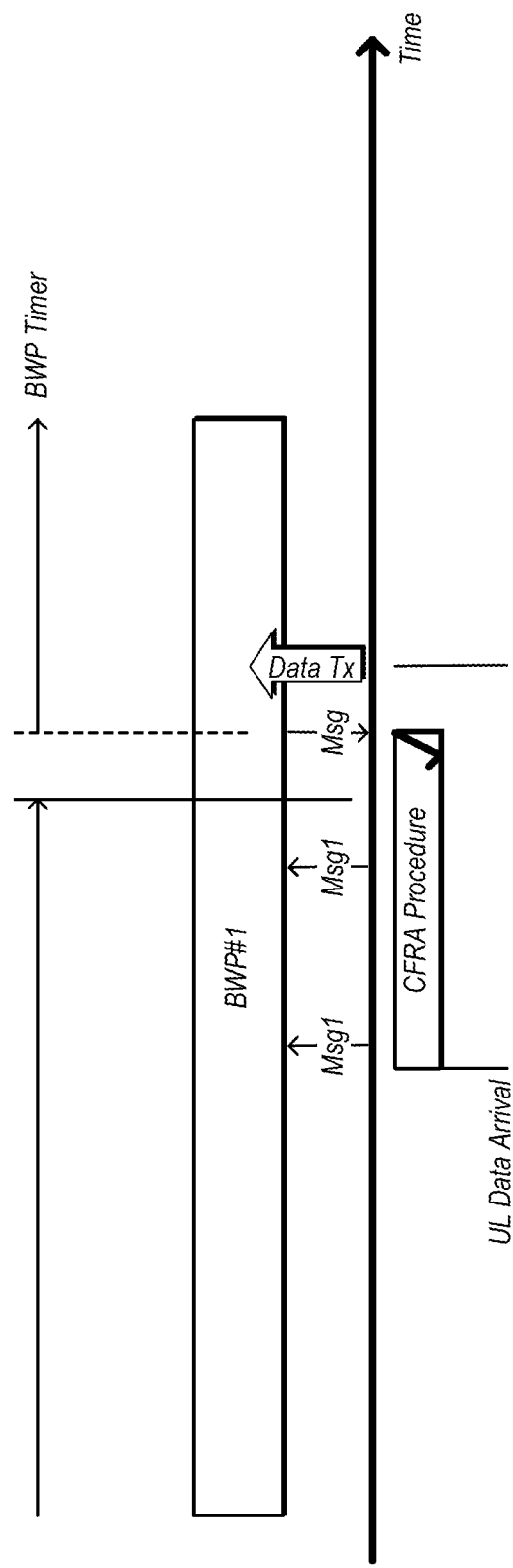

FIG. 9 illustrates further possible details of the approach of FIG. 8 in a scenario in which a RACH procedure is in progress upon expiry of the BWP activation timer. As shown, in such a case, the wireless device may continue the RACH procedure until the entire procedure is complete, e.g., including preamble retransmission(s), if needed. If the procedure is successfully completed, the BWP activation timer may be restarted and the wireless device may continue to use the non-default BWP, e.g., upon the wireless device receiving scheduling information (e.g., using a UE dedicated C-RNTI in the case of contention based random access (CBRA), or using a RA-RNTI in the case of contention free random access (CFRA)). Note, though, that if no msg2/msg4 is successfully received/decoded by the wireless device, the procedure may complete unsuccessfully, in which case the wireless device may fall back to the default BWP.

Figure 10:
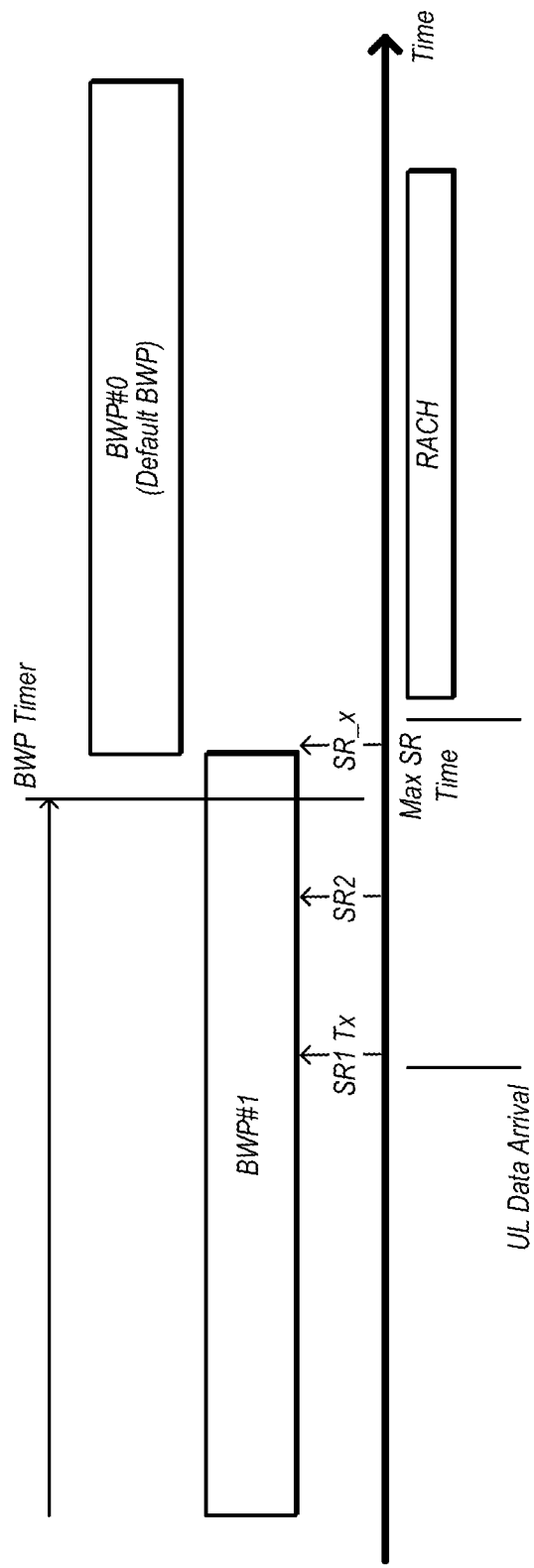

FIG. 10 illustrates further possible details of the approach of FIG. 8 in a scenario in which a SR procedure is in progress upon expiry of the BWP activation timer. As shown, in such a case, the wireless device may continue the SR procedure until the entire procedure is complete, e.g., including up to a specified maximum number of SR transmissions, if needed. If desired, a one time SR transmission approach (e.g., such that the maximum number of SR transmissions may be one) may be used, e.g., to reduce the potential amount of time beyond expiration of the BWP timer that the wireless device may remain on the non-default BWP.

If the procedure is successfully completed, the BWP activation timer may be restarted and the wireless device may continue to use the non-default BWP, e.g., upon the wireless device successfully receiving scheduling information. Note, though, that if the maximum number of SR transmissions is reached, and/or upon SR_prohibit timer expiry, the SR procedure may complete unsuccessfully, in which case the wireless device may fall back to the default BWP. The wireless device may follow up with a RACH procedure on the default BWP in this case, if desired, as shown. Alternatively, in case of an unsuccessful SR procedure that completes on a non-default BWP after BWP activation timer expiry, a RACH procedure may be triggered on the same (e.g., non-default) BWP while the BWP activation timer remains expired, if desired.

Note that the illustrated timelines are provided by way of example only, and any number of additional BWP activation schemes may also or alternatively be used, as desired.

In the following further exemplary embodiments are provided.

One set of embodiments may include a method for a wireless device, comprising: attaching to a network via a wideband cell comprising a plurality of bandwidth parts (BWPs); receiving an indication activating a first BWP; initiating a BWP activation timer based at least in part on receiving the indication activating the first BWP; initiating a random access channel (RACH) or scheduling request (SR) procedure on the first BWP; determining that the BWP activation timer expires during the RACH or SR procedure; and completing the RACH or SR procedure on the first BWP after expiration of the BWP activation timer.

According to some embodiments, the first BWP comprises a non-default BWP for the wireless device, wherein the method further comprises: receiving configuration information indicating a default BWP for the wireless device.

According to some embodiments, the method further comprises: deactivating the first BWP and activating the default BWP if there is not a RACH or SR procedure in progress via the first BWP at expiration of the BWP activation timer.

According to some embodiments, the method further comprises: deactivating the first BWP and activating the default BWP if the RACH or SR procedure is completed unsuccessfully after expiration of the BWP activation timer.

According to some embodiments, the method further comprises: receiving downlink control information via the first BWP during the RACH or SR procedure, wherein the downlink control information schedules data communication for the wireless device; and restarting the BWP activation timer after expiration of the BWP activation timer based at least in part on receiving the downlink control information via the first BWP.

According to some embodiments, completing the RACH or SR procedure on the first BWP after expiration of the BWP activation timer comprises: completing the RACH or SR procedure on the first BWP successfully if the wireless device receives an uplink grant or downlink assignment from the network as part of the RACH or SR procedure; or completing the RACH or SR procedure on the first BWP unsuccessfully if the wireless device does not receive a response from the network within a specified amount of time after a specified number of retries.

Another exemplary set of embodiments may include a wireless device, comprising: at least one antenna; a radio operably coupled to the at least one antenna; and a processing element operably coupled to the radio; wherein the wireless device is configured to: attach to a cell, wherein the cell comprises a plurality of bandwidth parts (BWPs); receive an indication activating a non-default BWP; initiate a BWP activation timer based at least in part on activation of the non-default BWP; initiate a procedure to perform an uplink data transfer via the non-default BWP; determine that the BWP activation timer has expired prior to completion of the procedure to perform an uplink data transfer via the non-default BWP; and complete the procedure to perform an uplink data transfer via the non-default BWP after expiration of the BWP activation timer.

According to some embodiments, the procedure to perform an uplink data transfer comprises one of: a random access channel (RACH) procedure; or a scheduling request procedure.

According to some embodiments, the wireless device is further configured to: receive configuration information indicating a default BWP for the wireless device; and deactivate the non-default BWP and activate the default BWP if there is not a procedure to perform an uplink data transfer in progress via the non-default BWP at expiration of the BWP activation timer.

According to some embodiments, the wireless device is further configured to: deactivate the non-default BWP and activate the default BWP if the procedure to perform an uplink data transfer is completed unsuccessfully after expiration of the BWP activation timer.

According to some embodiments, the wireless device is further configured to: receive downlink control information via the non-default BWP during the procedure to perform an uplink data transfer, wherein the downlink control information schedules data communication for the wireless device; and restart the BWP activation timer after expiration of the BWP activation timer based at least in part on receiving the downlink control information via the non-default BWP.

According to some embodiments, the wireless device is further configured to: receive configuration information indicating a BWP activation timer length.

Yet another exemplary set of embodiments may include an apparatus, comprising a processing element configured to cause a wireless device to: attach to a cell, wherein the cell comprises a plurality of bandwidth parts (BWPs); receive an indication activating a non-default BWP; initiate a BWP activation timer based at least in part on activation of the non-default BWP; complete a procedure to perform an uplink data transfer via the non-default BWP after expiration of the BWP activation timer if there is a procedure to perform an uplink data transfer in progress via the non-default BWP at expiration of the BWP activation timer; and deactivate the non-default BWP and activate a default BWP if there is not a procedure to perform an uplink data transfer in progress via the non-default BWP at expiration of the BWP activation timer.

According to some embodiments, the processing element is further configured to cause the wireless device to: receive downlink control information via the non-default BWP during the procedure to perform an uplink data transfer, wherein the downlink control information schedules data communication for the wireless device; and restart the BWP activation timer for the non-default BWP after expiration of the BWP activation timer based at least in part on receiving the downlink control information via the non-default BWP.

According to some embodiments, the procedure to perform an uplink data transfer comprises a scheduling request (SR) procedure, wherein the SR procedure is completed on the non-default BWP successfully if the wireless device receives an uplink grant from the network in response to an SR provided from the wireless device to the network, wherein the SR procedure is completed on the non-default BWP unsuccessfully if the wireless device does not receive a response from the network within a specified amount of time after a specified number of retries.

According to some embodiments, if the SR procedure is completed on the non-default BWP unsuccessfully after expiration of the BWP activation timer, the processing element is further configured to cause the wireless device to: initiate a random access channel (RACH) procedure via the non-default BWP based at least in part on the SR procedure being completed on the non-default BWP unsuccessfully.

According to some embodiments, if the SR procedure is completed on the non-default BWP unsuccessfully after expiration of the BWP activation timer, the processing element is further configured to cause the wireless device to: deactivate the non-default BWP and activate the default BWP based at least in part on the SR procedure being completed and the BWP activation timer having expired; and initiate a random access channel (RACH) procedure via the default BWP.

According to some embodiments, the procedure to perform an uplink data transfer comprises a contention based random access channel (RACH) procedure, wherein the contention based RACH procedure is completed on the non-default BWP successfully if the wireless device receives a message 2 from the network in response to a message 1 provided from the wireless device to the network and a message 4 from the network in response to a message 3 provided from the wireless device to the network, wherein the contention based RACH procedure is completed on the non-default BWP unsuccessfully if the wireless device does not receive a message 2 from the network within a specified amount of time after a specified number of message 1 retries or does not receive a message 4 from the network within a specified amount of time after a specified number of message 3 retries.

According to some embodiments, the procedure to perform an uplink data transfer comprises a contention free random access channel (RACH) procedure, wherein the contention free RACH procedure is completed on the non-default BWP successfully if the wireless device receives a message 2 from the network in response to a message 1 provided from the wireless device to the network, wherein the contention based RACH procedure is completed on the non-default BWP unsuccessfully if the wireless device does not receive a message 2 from the network within a specified amount of time after a specified number of message 1 retries.

According to some embodiments, the processing element is further configured to cause the wireless device to: receive configuration information indicating the default BWP for the wireless device; and receive configuration information indicating a BWP activation timer length.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for a wireless device, comprising:
at a first time, starting or restarting a bandwidth part (BWP) activation timer, based at least in part on receiving a first physical downlink control channel (PDCCH), for a first BWP of a plurality of BWPs of a cell, wherein the wireless device performs fallback to a default BWP of the plurality of BWPs of the cell upon expiry of the BWP activation timer, wherein the fallback to the default BWP comprises deactivating the first BWP and activating the default BWP;
initiating a random access channel (RACH) procedure on the first BWP;
avoiding performing the fallback to the default BWP during the RACH procedure; and
at a second time, completing the RACH procedure on the first BWP, wherein a time difference between the first time and the second time is longer than a length of the BWP activation timer.

2. The method of claim 1, wherein the first BWP comprises a non-default BWP for the wireless device, wherein the method further comprises:
receiving configuration information indicating the default BWP for the wireless device.

3. The method of claim 2, wherein the method further comprises:
deactivating the first BWP and activating the default BWP if there is not a RACH procedure in progress via the first BWP at expiration of the BWP activation timer.

4. The method of claim 1, wherein the first PDCCH includes an indication activating the first BWP.

5. The method of claim 1, wherein the first PDCCH includes a downlink control information (DCI) for an uplink or downlink transmission.

6. The method of claim 1, wherein the cell is associated with a network, wherein completing the RACH procedure on the first BWP comprises:
completing the RACH procedure on the first BWP successfully if the wireless device receives scheduling information from the network as part of the RACH procedure addressed to a cell radio network temporary identifier (C-RNTI) corresponding to wireless device.

7. The method of claim 6, further comprising:
when the RACH procedure is successfully completed, restarting the BWP activation timer.

8. An apparatus, comprising:
at least one processor, wherein the at least one processor is configured to cause a wireless device to:
at a first time, start or restart a bandwidth part (BWP) activation timer, based at least in part on receiving a first physical downlink control channel (PDCCH), for a first BWP of a plurality of BWPs of a cell, wherein the wireless device performs fallback to a default BWP of the plurality of BWPs of the cell upon expiry of the BWP activation timer, wherein the fallback to the default BWP comprises deactivating the first BWP and activating the default BWP;
initiate a random access channel (RACH) procedure on the first BWP;
avoid performing the fallback to the default BWP during the RACH procedure; and
at a second time, complete the RACH procedure on the first BWP, wherein a time difference between the first time and the second time is longer than a length of the BWP activation timer.

9. The apparatus of claim 8, wherein the first BWP comprises a non-default BWP for the wireless device, wherein at least one processor is further configured to:
receive configuration information indicating the default BWP for the wireless device.

10. The apparatus of claim 9, wherein at least one processor is further configured to:
deactivate the first BWP and activating the default BWP if there is not a RACH procedure in progress via the first BWP at expiration of the BWP activation timer.

11. The apparatus of claim 8, wherein the first PDCCH includes an indication activating the first BWP.

12. The apparatus of claim 8, wherein the first PDCCH includes a downlink control information (DCI) for an uplink or downlink transmission.

13. The apparatus of claim 8, wherein the cell is associated with a network, wherein completing the RACH procedure on the first BWP comprises:
completing the RACH procedure on the first BWP successfully if the wireless device receives scheduling information from the network as part of the RACH procedure addressed to a cell radio network temporary identifier (C-RNTI) corresponding to wireless device.

14. The apparatus of claim 13, wherein at least one processor is further configured to:
when the RACH procedure is successfully completed, restarting the BWP activation timer.

15. A wireless device, comprising:
wireless communication circuitry; and
at least one processor coupled to the wireless communication circuitry, wherein the at least one processor is configured to cause the wireless device to:
at a first time, start a bandwidth part (BWP) activation timer, based at least in part on receiving a first physical downlink control channel (PDCCH), for a first BWP of a plurality of BWPs of a cell, wherein the wireless device performs fallback to a default BWP of the plurality of BWPs of the cell upon expiry of the BWP activation timer, wherein the fallback to the default BWP comprises deactivating the first BWP and activating the default BWP;
initiate a random access channel (RACH) procedure on the first BWP;
avoid performing the fallback to the default BWP during the RACH procedure;
at a second time, complete the RACH procedure on the first BWP, wherein a time difference between the first time and the second time is longer than a length of the BWP activation timer; and
when the RACH procedure is successfully completed, restarting the BWP activation timer.

16. The wireless device of claim 15, wherein the first BWP comprises a non-default BWP for the wireless device, wherein at least one processor is further configured to:
receive configuration information indicating the default BWP for the wireless device.

17. The wireless device of claim 16, wherein at least one processor is further configured to:
deactivate the first BWP and activating the default BWP if there is not a RACH procedure in progress via the first BWP at expiration of the BWP activation timer.

18. The wireless device of claim 15, wherein the first PDCCH includes an indication activating the first BWP.

19. The wireless device of claim 15, wherein the first PDCCH includes a downlink control information (DCI) for an uplink or downlink transmission.

20. The wireless device of claim 15, wherein the cell is associated with a network, wherein completing the RACH procedure on the first BWP comprises:
completing the RACH procedure on the first BWP successfully if the wireless device receives scheduling information from the network as part of the RACH procedure addressed to a cell radio network temporary identifier (C-RNTI) corresponding to wireless device.

* * * * *